United States Patent [19]

Rutishauser

[11] 4,204,220
[45] May 20, 1980

[54] DUAL STANDARD VIDEO DISC PLAYER

[75] Inventor: Ernst A. O. Rutishauser, Widen, Switzerland

[73] Assignee: RCA Corporation, New York, N.Y.

[21] Appl. No.: 918,379

[22] Filed: Jun. 23, 1978

[30] Foreign Application Priority Data

Jun. 24, 1977 [GB] United Kingdom ............... 26626/77

[51] Int. Cl.² .............................................. H04N 5/76
[52] U.S. Cl. ........................................ 358/8; 358/4; 358/11
[58] Field of Search ................. 360/33, 30, 9, 37, 36; 358/127, 4, 8, 11, 31, 17

[56] References Cited

U.S. PATENT DOCUMENTS

| | | | |
|---|---|---|---|
| 3,845,237 | 10/1974 | Yamakawa | 358/4 |
| 3,872,498 | 3/1975 | Pritchard | 358/4 |
| 3,893,164 | 7/1975 | Raedecke | 358/31 |
| 3,917,415 | 11/1975 | Eguchi | 358/11 |
| 3,969,757 | 7/1976 | Amery | 358/4 |
| 3,974,520 | 8/1976 | Kuroyanagi | 358/8 |
| 3,996,610 | 12/1976 | Kawamoto | 358/31 |

*Primary Examiner*—James W. Moffitt
*Assistant Examiner*—Alan Faber
*Attorney, Agent, or Firm*—Eugene M. Whitacre; William H. Meagher

[57] ABSTRACT

Video disc player is switchable between two operating modes: (1) for playback of records of color signals of one scanning standard (15,625 Hz. line frequency; 50 Hz. field frequency) encoded in a buried subcarrier format; (2) for playback of records of color signals of another scanning standard (15,734.26 Hz. line frequency; 59.94 Hz. field frequency) also encoded in a buried subcarrier format, but with a different subcarrier frequency. When operating in mode (1), recovered signals are heterodyned with output of a VCO to up-convert chrominance signal and accompanying color synchronizing component. Control of VCO is effected in accordance with output of a phase detector responding to up-converted color synchronizing component and to reference oscillations, whereby up-converted signals are stabilized against time-base errors. Switching to mode (2) effects a shift of reference oscillation frequency (or of nominal VCO output frequency) by an amount equal to frequency difference between respective subcarrier frequencies.

8 Claims, 4 Drawing Figures

DUAL STANDARD VIDEO DISC PLAYER

The present invention relates to video disc player apparatus suitable for use in playback of video disc records of two different recording signal formats.

When storing color picture information in the track of a disc record (such as a record of the variable capacitance type described in U.S. Pat. No. 3,842,194—Clemens), effective bandwidth limitations militate against recording color television signals in encoding formats of standard NTSC, PAL, or SECAM type. In U.S. Pat. No. 3,872,498—Pritchard, a non-standard color television signal encoding format of a so-called "buried subcarrier" form is disclosed as particularly advantageous for video disc recording purposes. In the buried subcarrier format, the chrominance signal falls in a midband portion (e.g., 1-2 MHz.) of the luminance signal. Comb filtering of the luminance signal prior to combination with the chrominance signal prepares signal-free troughs in the midband portion of the luminance signal, while comb filtering of the chrominance signal prior to the combination substantially confines the chrominance signal components to the aforesaid trough regions.

In illustrative applications of the buried subcarrier approach, as disclosed in U.S. Pat. No. 3,872,498, the color encoding employed with the buried subcarrier is akin to NTSC encoding in (1) employing a subcarrier frequency choice substantially corresponding to an odd multiple of half the line frequency (whereby there is a half-line frequency offset between the luminance and buried subcarrier sideband spectra), and (2) forming the modulated subcarrier by summing (a) the resultant of modulating a first subcarrier component of a first constant phase with a first color-difference signal, such as R-Y, with (b) the resultant of modulating a second subcarrier component of a second constant phase (in quadrature relation to the first constant phase) with a second color-difference signal, such as B-Y (with the consequence that there is only a phase offset between the two subcarrier components).

When color encoding of the above-described type is employed with the buried subcarrier approach in preparation of a recording signal, the subsequent separation of the luminance and chrominance components of the buried subcarrier signal, upon playback of the disc recording, is facilitated. The separation may be effected, for example, through use of a comb filtering system of a type employing a single 1H delay line, such as shown for example, in U.S. Pat. No. 3,969,757.

In an illustrative example of use of the buried subcarrier signal, as described in U.S. Pat. No. 3,872,498, for video signals of the type having a line frequency ($f_H$) of 15,734.26 Hz and a field frequency of 59.94 Hz., the buried subcarrier frequency choice is equal to 195/2 $f_H$ (or, approximately 1.534091 MHz.). The color-difference modulating signals have a bandwidth of 0-500 KHz., whereby the spectrum occupied by the sidebands of the buried subcarrier corresponds to 1.534091 MHz.±500 KHz. (or, approximately 1-2 MHz.). Illustratively, the accompanying luminance signal component is restricted to a bandwidth of 0-3 MHz. a low frequency portion (e.g., 0-900 KHz.) of the luminance signal is effectively free of the effects of combing (for purposes of preservation of "vertical detail" information).

In contrast, when color encoding of a PAL type (involving line-by-line phase alternation of one subcarrier component) is employed with the buried subcarrier approach in preparation of a recording signal, the subsequent separation of luminance and chrominance components of the buried subcarrier, upon playback of the disc recording, is not facilitated. That is, with subcarrier frequency choice, in the PAL fashion, to substantially correspond to an odd multiple of one-quarter of the line frequency, the recorded signal would have only a quarter-line frequency offset between the luminance and buried subcarrier sideband spectra. With such an offset, adequate separation of luminance and buried subcarrier sideband components in playback operations cannot be achieved with comb filters of a simple type employing a single 1H delay line. Moreover, the dot pattern associated with display of any residual buried subcarrier components of a PAL type of buried subcarrier signal is more objectionable than the dot pattern associated with a half-line frequency offset buried subcarrier signal of the previously mentioned non-PAL type disclosed in U.S. Pat. No. 3,872,498.

Use of color encoding in a SECAM fashion is not feasible with the buried subcarrier approach, since the varying frequency spacing between FM subcarrier components and the luminance spectra effectively preclude use of the desired comb filter actions in recording signal formation and playback signal processing.

In the pending British patent application, Ser. No. 33,120/76, (and in the counterpart U.S. application, Ser. No. 822,659 of Carnt, et al.) it is proposed that a color encoding format, employing the buried subcarrier approach of U.S. Pat. No. 3,872,498, with (1) a substantially half-line frequency offset between luminance and buried subcarrier sideband spectra, and (2) with only a phase offset between the respective pair of subcarrier components, should be employed in the recording of discs for use with both (1) disc players designed to provide PAL-type outputs for driving PAL-type color television receivers, and (2) disc players designed to provide SECAM-type outputs for driving SECAM-type color television receivers.

It is further proposed that the precise frequency choice for the buried subcarrier employed in recording signal formation differ slightly from an odd integral multiple of half the line frequency, with the slight difference corresponding substantially to half the field frequency. This difference is so slight that it has no significant adverse effect on the accuracy of component separation achieved with comb filters employing 1H delay lines. However, the imposition of this additional half-field frequency offset can provide a desirable result of effectively lessening the visibility of a dot pattern produced by display of residual buried subcarrier components through alteration of the appearance of the pattern crawl. An illustrative choice for the buried subcarrier frequency, pursuant to the proposals of the aforesaid British application, is 1,476,587.5 Hz, corresponding to the sum of (a) one-half a field frequency of 50 Hz, and (b) 189 times one-half a line frequency of 15,625 Hz.

In the standard NTSC signal, the modulated color subcarrier waves are accompanied by color synchronizing information in the form of periodic bursts of color subcarrier frequency waves of constant amplitude and constant phase, each burst occurring during the "backporch" interval following a horizontal synchronizing pulse and having a $-(B-Y)$ phase, 180° away from the phase of the subcarrier component subject to modulation of $+(B-Y)$ color difference signals. In the standard PAL signal, color synchronizing bursts are also provided during such backporch intervals; the PAL burst, however, is subject to a line-by-line alternation of its phasing between a phase lagging the −(B-Y) phase by 45°, and a phase leading the −(B-Y) phase by 45°. For the recording purposes of the aforesaid British application, it is proposed that the modulated buried subcarrier waves should be accompanied by color synchronizing bursts of buried subcarrier frequency, which are akin to the standard NTSC bursts in having phase constancy (free from the line-by-line phase changes of the PAL "swinging burst"), but differing from the standard NTSC bursts in that the constant phase of the bursts differs from the −(B-Y) phase by 45°. The sense of the 45° difference is desirably such that it corresponds to the phasing of the resultant of summing equal amplitude buried subcarrier components of +(R-Y) and −(B-Y) phasing, respectively. The use of the above-described form for the buried subcarrier bursts facilitates a subsequent transformation of the buried subcarrier signal (e.g., in a disc player) to a form suitable for driving PAL-type color television receivers (without disturbance to an alternative transformation of the buried subcarrier signal to a form suitable for driving SECAM-type color television receivers).

The standard PAL signal has a "meandering" burst blanking during successive vertical blanking intervals, which is such that the last and first bursts of each field have the same phase. The burst blanking is effected within a period having a width of 9 lines, which period effectively advances in half-line steps, when the field order is taken as 4, 1, 2, 3 (as illustrated, for example, on page 30 of the Carnt-Townsend book, entitled "Colour Television-Volume 2", and published in 1969 by Iliffe Books, Ltd., London, England). For the recording signal formation purposes of the aforesaid British application, the buried subcarrier burst blanking is desirably effected with a similar form of "meander" (i.e., effected within a period having a width of 9 lines, which period effectively advances in half-line steps, when the field order is taken as 4, 1, 2, 3, shown in the aforesaid book), even though all of the buried subcarrier bursts are of the same phase. The presence of the aforesaid meander of the buried subcarrier burst blanking period facilitates a subsequent player transformation of the buried subcarrier signal to a form capable of driving a PAL-type color television receiver with minimum disturbance of the receiver's reference carrier generator at each field beginning (without) adverse effect on an alternative transformation of the buried subcarrier signal to a form suitable for driving a SECAM-type color television receiver).

In an illustrative example of use of the buried subcarrier signal described in the aforesaid British application, the color-difference modulating signals have a bandwidth of 0–500 KHz., whereby the spectrum occupied by the sidebands of the buried subcarrier corresponds to 1.4765875 MHz.±500 KHz. (or approximately 1–2 MHz). Illustratively, the accompanying luminance signal component is restricted to a bandwidth of 0–3 MHz. As in U.S. Pat. No. 3,872,498, prior to addition with the buried subcarrier sideband components, the luminance signal component is subject to combing, at least in the to-be-shared midband region (e.g., 1–2 MHz.), to prepare signal-free spectrum troughs for buried subcarrier sideband component occupancy. While the luminance component combing may extend beyond the midband boundaries, it is desirable that a low frequency portion (e.g., 0–900 KHz.) remain effectively uncombed, so as to permit retention in the recorded luminance signal of "vertical detail" information. The modulated color subcarrier waves are also subject to combing prior to addition with the luminance signal so as to substantially confine the buried subcarrier sideband components to the aforementioned trough regions. In another copending British Provisional Application, Ser. No. 33,118/76, a description is provided of an advantageous form of transcoding apparatus which may be employed to transform a standard PAL signal into a buried subcarrier signal of the form described hereinabove.

The present invention is concerned with the provision of a video disc player conveniently subject to operation in two playback modes, whereby both (1) records containing color signals of the scanning standard type (15,734.26 Hz. line frequency; 59.94 Hz. field frequency) considered in U.S. Pat. No. 3,872,498, and encoded in the buried subcarrier format therein described, and (2) records containing color signals of the scanning standard type (15,625 Hz. line frequency; 50 Hz. field frequency) considered in the aforementioned Carnt, et al. applications, and encoded in the modified buried subcarrier format therein described, are subject to playback in the same player.

In the playback of video disc records, various operating conditions can result in the presence of time-base errors in the signals recovered from the record. It is desirable that a player output delivered to a color television receiver include a chrominance component stabilized against such time-base errors to avoid color distortion in the reproduced color image.

In player apparatus described in the aforementioned Carnt, et al. applications, correction of time-base errors in a recovered chrominance component is associated with a heterodyning operation that effects an up-conversion of the buried subcarrier chrominance component recovered from the record, which up-conversion precedes signal application to comb filter apparatus for separation of luminance and chrominance components. In such error correction apparatus, signals recovered from the record are heterodyned with the output of a voltage controlled crystal oscillator (VCXO) to effect the up-conversion. A phase detector responsive to the up-converted color synchronizing component and to an output of a reference crystal oscillator develops an error voltage indicative of departures from a desired phase relationship between the respective detector inputs, and the error voltage is applied to the VCXO to alter its output frequency in a manner opposing such departures.

In an illustrative application of the dual-mode player principles of the present invention to correction apparatus of the above-described type, the reference oscillator is rendered capable of two operating modes by use of switch selection of either of two crystals as the oscillator's frequency determining element. Illustratively, during playback of records bearing signals utilizing a field frequency (fr) of 50 Hz., a line frequency ($f_H$) of 15,625 Hz., and a buried subcarrier frequency of 1.4765875 Hz. (equal to $f_V/2 + 189\ f_H/2$), the active crystal for the reference oscillator establishes the reference oscillation frequency at 4.4296875 MHz ($567\ f_H/2$), while the nominal output frequency of the VCXO (absent an error voltage input) is equal to sum of the aforesaid buried subcarrier frequency and the aforesaid reference oscillation frequency, i.e., is equal to 5.906275 MHz. ($378\ f_H + f_V/2$). On the other hand, during playback of records bearing signals utilizing a field frequency of 59.94 Hz., a line frequency of 15,734.26 Hz., and a buried subcarrier frequency of 1.534091 MHz. (195 $f_H/2$), the active crystal selected for the reference oscillator establishes the reference oscillation frequency at 4.372184 MHz., while the nominal VCXO output frequency remains at 5.906275 MHz. It will be noted that the reference oscillation frequency in this second operating mode is exceeded by the reference oscillation frequency in the first mentioned operating mode by a frequency difference of 0.0575035 MHz., which corresponds to the frequency difference between the respective buried subcarriers of the two record formats. It will further be noted that the reference oscillation frequency selected for the second operating mode corresponds to the difference between the retained nominal output frequency of the VCXO (5.906275 MHz.) and the buried subcarrier frequency (1.534091 MHz.) of the second record type. It will be seen that via the expedient of oscillation frequency switching, common apparatus may be used for time base error correction of the chrominance component from two different record types.

In further accordance with the illustrative application of the invention principles above described, the up-converted signal product of the heterodyning operation is supplied to the appropriate selected one of two comb filter systems, one employing an ultrasonic delay line of a delay time equal to a period at the line frequency of the scanning standards of the first record type, and the other employing an ultrasonic delay line of a delay time equal to a period at the line frequency of the scanning standards of the second record type. The separated chrominance component output of the selected comb filter system is supplied to synchronous detector apparatus, also responsive to suitably phased versions of the reference oscillator output, which recovers respective color difference signals (B-Y; R-Y) from the up-converted chrominance component. The recovered color-difference signals may be supplied directly to the maxtrix circuits of a color television receiver, or (where an RF input to the antenna terminals of the receiver are desired) supplied to remodulation apparatus, e.g., also responsive to oscillations at the standard PAL subcarrier frequency of 4.43361875 MHz., to reform a modulated subcarrier chrominance component (for addition with the separated luminance component to form a composite color video modulating signal for local RF transmitter apparatus).

In U.S. Pat. No. 3,996,610—Kawamoto, video disc player apparatus is illustrated wherein the comb filtering apparatus employed for separation of the luminance and chrominance components of a recorded signal in the buried subcarrier format utilizes a delay device of the CCD type. In such player apparatus, the up-conversion of the buried subcarrier chrominance component, and the chrominance component time base error correction associated therewith, may conveniently follow, rather than precede, the comb filtering operation (as illustrated in said Kawamoto patent). The principles of the present invention are also applicable to modification of a player of the Kawamoto type for dual-mode use.

A dual-mode form of the Kawamoto type of player may be considerably simplified where the buried subcarrier frequencies of the respective record types bear substantially corresponding ratios to the respective line frequencies. Illustratively, where the record of the Pritchard type bears signals utilizing the aforementioned frequencies of $f_H = 15,734.26$ Hz., $f_V = 59.94$ Hz., and $f_{SC} = 1.534091$ MHz. or 195 $f_H/2$, a convenient subcarrier frequency choice for the record of the Carnt, et al. type (having $f_H = 15,625$ Hz. and $f_V = 50$ Hz.) is 1.5234625 MHz. (which corresponds to 195 $f_H/2 + f_V/2$). With the respective buried subcarrier frequencies bearing such as a substantially common relationship to the respectively associated line frequency, the Kawamoto type comb filter circuitry (wherein the CCD clock frequency is effectively entrained to bear an integral multiple relationship to the incoming subcarrier frequency) may serve in common for accurate comb filter separation of the luminance and chrominance components of the signals recovered from either of the two record types (i.e., without need for duplication of comb filter circuits, and switching therebetween).

With up-conversion in the Kawamoto type of player effected after comb filtering, reference frequency choice may be made independent of comb filtering needs (i.e., the reference frequency need not be at, or near, an odd integral multiple of line frequency). Given such freedom, a desirable choice for the reference frequency during playback (by the Kawamoto type player) of records of the aforementioned Carnt, et al. type is the standard PAL subcarrier frequency of 4.43361875 MHz.

In an illustrative application of the principles of the present invention to a player of the aforementioned Kawamoto type, time base error correction of the chrominance component output of the CCD comb filter is effected by the heterodyning of the separated chrominance component with the output of a VCXO having a nominal output frequency of 5.95708125 MHz. (corresponding to the sum of the PAL subcarrier frequency and the aforementioned buried subcarrier frequency of 1.5234625 MHz. Control of the VCXO during playback of records of the Carnt, et al. type is effected by the error voltage output of a phase detector responsive to the up-converted color synchronizing component and to reference oscillations at the PAL subcarrier frequency. Where the player incorporates remodulation apparatus, the source for the reference oscillations of this frequency may conveniently be the same crystal oscillator that is the carrier source for the remodulation apparatus. When the player is switched to its second operating mode for playback of records of the Pritchard type, reference oscillations at a frequency of 4.42299025 MHz. (corresponding to the difference between the aforesaid VCXO frequency of 5.95708125 MHz. and the buried subcarrier frequency of 1.534091 MHz.) are substituted for the reference oscillations of PAL subcarrier frequency.

In the two invention embodiments heretofore described, reference oscillation frequency switching has been relied upon to permit use of a common time base error correction system for playback of two record types having different subcarrier frequencies. As an alternative to reference oscillation frequency switching, switching of the nominal output frequency of the VCXO may be employed instead. In an illustrative example of this approach, the time base error correction system in a player of the aforementioned Kawamoto type employs reference oscillations of the PAL subcarrier frequency in both operating modes. The nominal output frequency of the VCXO, however, is alternatively controlled by first and second crystals. During playback of records of the Carnt, et al. type having a buried subcarrier frequency of 1.5234625 MHz., the first crystal establishes the nominal output frequency of the VCXO at 5.95708125 MHz. (corresponding to the sum of said buried subcarrier frequency and the fixed reference frequency). During playback of records of the Pritchard type having a buried subcarrier frequency of 1.534091 MHz., the second crystal is switched in place of the first to establish the nominal output frequency of the VCXO at 5.96770975 MHz. (corresponding to the sum of the latter buried subcarrier frequency and the fixed reference frequency).

Figure 1:
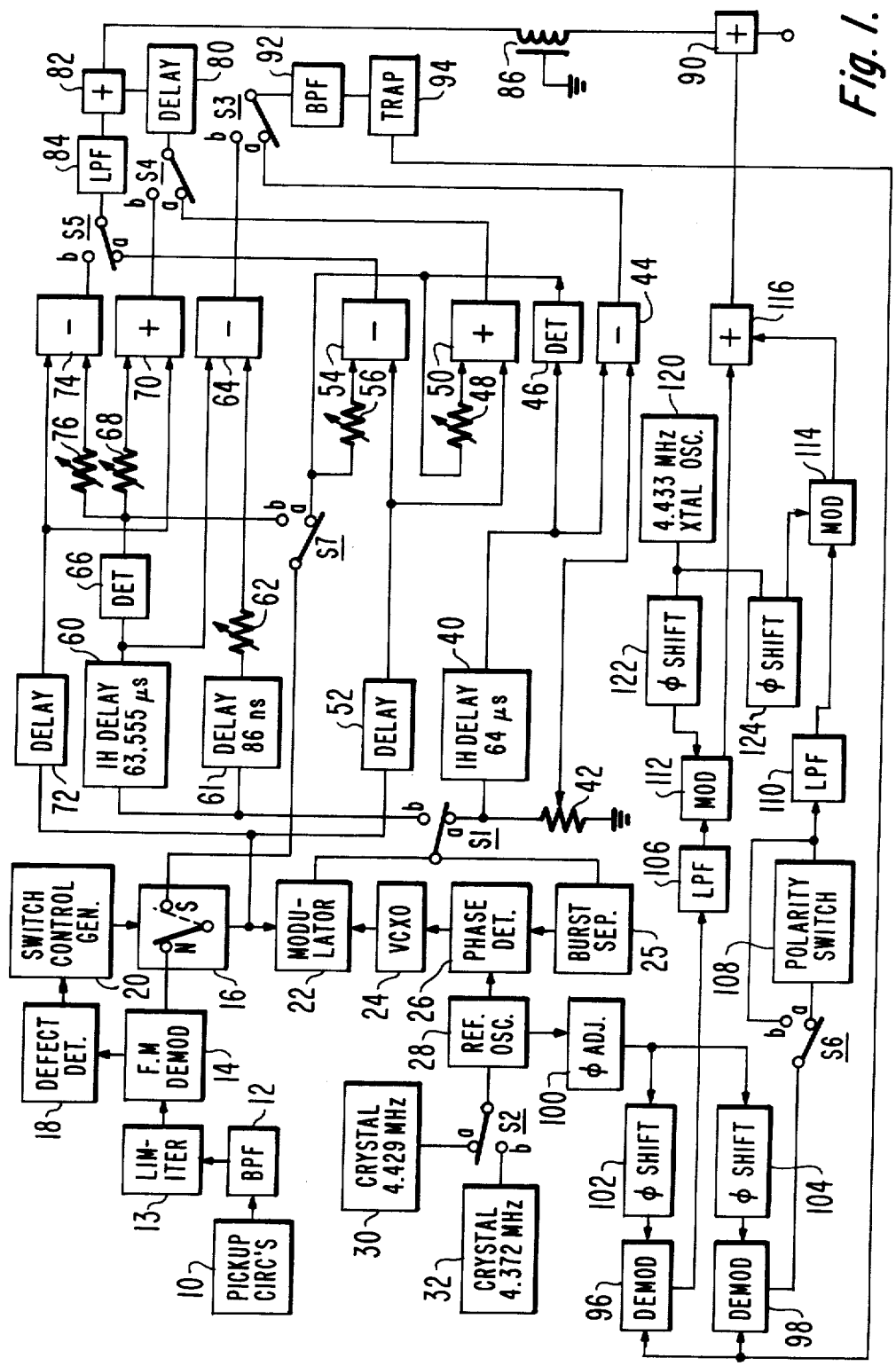
FIG. 1 illustrates a dual standard video disc player embodying the principles of the present invention.

In the player apparatus of FIG. 1, a recorded signal is recovered during playback of a video disc by video disc pickup circuits 10, which may be, for example, as described in U.S. Pat. No. 3,872,240—Carlson, et al. Illustratively, the recording format for the disc is such that the recovered signal includes a frequency modulated picture carrier, the instantaneous carrier frequency deviating within fixed deviation range limits (e.g., 3.9 MHz-6.9 MHz) in accordance with the amplitude of a composite color video signal occupying a band of frequencies (e.g., 0-3 MHz.) below the deviation range, and representative of a succession of color images to be displayed. The composite color video signal format is alternatively one of the two types discussed above. The player apparatus includes a plurality of ganged mode-changing switches (S1, S2, S3, S4, S5, S6 and S7), which are all illustrated as thrown to the position ("a") placing the player in an operating mode suitable when the composite video signal format of the record is of the modified buried subcarrier format of the aforementioned Carnt, et al. application. When the mode-changing switches are thrown to position "b", the player's operating mode is suitable for playback of records having the (NTSC compatible) buried subcarrier format described with reference to U.S. Pat. No. 3,872,498.

A bandpass filter 12, having a passband encompassing the picture carrier deviation range and appropriate sidebands thereof, selectively passes the frequency modulated picture carrier components in the output of pickup circuits 10 to a limiter 13. The limiter output is applied to an FM demodulator 14, providing an output in the form of a composite video signal corresponding to the modulation of the input FM signal.

Associated with the FM demodulator 14 is a defect detector 18, developing a defect indicating output, when the demodulator input frequency departs from the expected deviation range, from application to a switch control wave generator 20. The output of a generator 20 controls the switching state of electronic switching apparatus 16, which serves the purpose of alternatively: (1) completing a signal path between a "normal" signal input terminal N and the switching apparatus output terminal 0 or (2) completing a signal path between a "substitution" signal input terminal S and the output terminal 0.

The output terminal 0 of the switching apparatus 16 is coupled to the modulating signal input terminal of an amplitude modulator 22. The "normal" input signal to the switching apparatus 16 (i.e., the signal applied to terminal N, and conveyed therefrom to the modulating input signal terminal of modulator 22 during normal conditions of operation of the video disc player) is the composite video signal output of FM demodulator 14. The "substitution" input signal (i.e., the signal applied to terminal S, and conveyed therefrom to the modulating signal input terminal of modulator 22 during defect masking conditions of operation of the player) is a delayed composite video signal derived in a manner to be subsequently described.

Amplitude modulator 22 serves to modulate the amplitude of carrier waves, supplied by a voltage controlled crystal oscillator (VCXO 24), in accordance with the signals delivered from terminal 0 of switching apparatus 16. Amplitude modulator 22 is desirably of the singly balanced type (balanced against the modulating signal).

The nominal frequency of the carrier waves supplied by oscillator 24 corresponds to the sum of the buried subcarrier frequency of the modified buried subcarrier system (e.g., $f_V/2 + 189\,f_H/2$ or 1.4765875 MHz.) and an odd multiple of half the line frequency which lies in the immediate vicinity of the standard PAL color subcarrier frequency (e.g., 567 $f_H/2$, or 4.4296875 MHz.), with the illustrative sum thus corresponding to 378 $f_H + f_V/2$, or 5.906275 MHz. The modulator 22 thus effects an up-converting of the buried subcarrier to the 4.4296875 MHz. value.

Control of VCXO 24 is effected in accordance with the output of a phase detector 26 which compares color synchronizing bursts of the up-converted signal, separated by a burst separator 25, with reference waves supplied by a reference oscillator 28. Associated with the reference oscillator 28, as its operating frequency determining element (during operation in the "a" mode), is a 4.4296875 MHz. crystal (coupled to oscillator 28 via switch S2 in its "a" position). The phase detector output comprises an error signal which controls the VCXO output frequency in a sense opposing departures from frequency and phase synchronism between the separated bursts and the output of reference oscillator 28. Thus, stability of location of the up-converted color subcarrier and its sidebands at respective odd multiples of half the line frequency is ensured, despite the possible presence of time base instabilities in the signals recovered during record playback.

Switch S1, in the "a" position, supplies the output of modulator 22 to a 1H delay line 40, providing a delay corresponding to 64 microseconds; i.e., one period at the line frequency (15,625 Hz.) of the recorded signals (for "a" mode operations). The output of delay line 40 is subtractively combined with the delay line input in combiner 44, with the delay line input fed to combiner 44 via a potentiometer 42 (to facilitate amplitude matching of the combiner inputs). The signal combining effects a comb filtering action (of a form providing multiple rejection notches at even integral multiples of half the line frequency) which allows bandpass filter 92, (coupled to the output of combiner 44 via switch S3 in the "a" position) to pass the up-converted chrominance signal, substantially free of accompaniment by up-converted luminance signal components. A trap 94, tuned for rejection of the VCXO operating frequencies, ensures that the up-converted chrominance signal is not undesirably accompanied by carrier components.

The output of trap 94 is supplied to a pair of demodulators 96 and 98, also receiving respective reference wave inputs from reference oscillator 28. The reference wave application is via a common phase adjuster 100, and respectiive ones of phase shift circuits 102, 104, to provide respective reference wave phases appropriate to recovery, via synchronous detection, of B-Y color difference signals by demodulator 96, and R-Y color difference signals by demodulator 98. Respective low pass filters 106, 110 confine the demodulator outputs to the appropriate color difference signal bandwidth (e.g., 0–500 KHz.). Polarity switching means 108, disposed between demodulator 98 and filter 110 by switch S6 in its "a" position, and controlled by switching waves of a frequency equal to $f_H/2$, serves to reverse the polarity of the R-Y color-difference signal during alternate line intervals (in PAL fashion).

The outputs of filters 106, 110 are applied respectively to modulators 112, 114. Quadrature-related phases of carrier waves at the standard PAL color subcarrier frequency (4.43361875 MHz.) are respectively supplied to modulators 112, 114 from phase shift circuits 122, 124 coupled to crystal oscillator 120 (operating at said PAL color subcarrier frequency). The modulated color subcarrier wave outputs of the modulators are combined in adder 116 to form a PAL type chrominance signal, which is supplied to an output composite signal forming combiner 90.

The output of 1H delay line 40 is also applied to an amplitude detector 46 to form a line delayed version of the composite video signal input to modulator 22. This line delayed version is supplied: (1) to combiner 50 for additive combination with the signal input to modulator 22; (2) to combiner 54 for subtractive combination with the signal input to modulator 22; and (3), via switch S7 in the "a" position, to the substitution signal input terminal S of the electronic switch 16 (to serve as a stored signal input to modulator 22, during defect masking conditions of operation of the player).

The signal combining in the respective combiners 50 and 54 effects a comb filtering action (the former providing multiple rejection notches at odd integral multiples of half the line frequency, and the latter providing multiple rejection notches at even integral multiples of half the line frequency). Respective amplitude adjusters 48 and 56 for the respective delayed signal inputs permit proper amplitude matching for these comb filters, while a delay device 52 common to the other signal inputs (and matching the delay associated with the detector function) permits proper phase matching for these comb filters.

The output of combiner 50 provides luminance signal components freed of chrominance signal components, but also suffering loss of vertical detail information. The output of combiner 50 is supplied, via switch S4, in its "a" position, and a delay device 80, to an adder 82. The output of combiner 54 is also supplied to adder 82 via switch S5, in its "a" position, and a low pass filter 82 having a cutoff frequency spaced below the lowest buried subcarrier sideband frequency (e.g., at 500 KHz.). The output of adder 82 comprises a luminance signal, still free of chrominance components but with restored vertical detail information. The delay provided by device 80 matches the delay associated with filter 84. The output of adder 82 is supplied via delay line 86 to the output composite signal forming combiner 90, with the delay compensation provided by line 86 effecting a desired degree of realignment of correlated luminance and chrominance information.

Thus, the described apparatus, in the "a" mode of operation, enables formation of a PAL-like composite signal output in response to playback of a disc record having signals encoded in the manner described in the Carnt, et al. application. The composite signal output may, for example, serve as the video input for transmitter apparatus, such as described in U.S. Pat. No. 3,775,555—Carlson, for developing an RF signal for application to the antenna terminals of a PAL-type color TV receiver.

To playback a disc record having signals encoded in the manner described with reference to U.S. Pat. No. 3,872,498; i.e., with $f_H$=15,734.26 Hz., buried subcarrier at 195 $f_H/2$, or 1.534091 MHz., and burst at standard −(B-Y) phase; the switches S1 through S7 are thrown to their "b" positions.

The "b" position for switch S2 associates a 4.372184 MHz. crystal with reference oscillator 28 (where 4.372184 MHz. corresponds to the difference between the VCXO nominal frequency and the buried subcarrier frequency of 1.534091 MHz.). The up-converted color subcarrier at the output of modulator 22 is thus maintained at the aforesaid 4.372184 MHz. frequency. Switch S1 in its "b" position supplies the modulator output to 1H delay line 60 (providing a line period delay at $f_H$=15,734.26 Hz.) and to an 86 nanosecond delay device 61. Subtractive combination of the outputs of line 60 and device 61 in combiner 64 (with amplitude adjuster 62 permitting amplitude matching) provides adequate combing, of a form passing chrominance components, to supply the proper input (via switch S3 in its "b" position) to the previously mentioned chrominance selecting bandpass filter 92 (despite the fact that 4.372184 is not an exact odd integral multiple of half the line frequency).

The output of line 60 is supplied to an amplitude detector 66 to develop a line delayed version of the input to modulator 22. The detector output is supplied to additive combiner 70, subtractive combiner 74, and (via switch S7 in its "b" position) to substitution signal input terminal S. The input to modulator 22 is also supplied via delay device 72 to combiners 70 and 74. Amplitude adjusters 68 and 76 control the amplitudes of the delayed signal inputs to combiners 70, 74. The functions of combiners 70, 74, adjusters 68, 76 and delay device 72 are similar to those of the previously described elements 50, 54; 48, 56; and 52. Switching of switches S4 and S5 to the "b" positions substitues the outputs of combiers 70, 74 for the outputs of 50, 54 in the formation of a luminance signal input to adder 90. The chrominance signal input to adder 90 is derived from adder 116 as previously described. The demodulation-remodulation operation is also as described before, with the following alterations: reference inputs to demodulators 96, 98 are now at the frequency of crystal 32; the input to filter 92 is derived from combiner 64; and polarity switcher 108 is bypassed by switch S6 in its "b" position.

The output of adder 90, during "b" mode operations, is thus an NTSC-like composite signal (with, however, the color subcarrier at a frequency value corresponding to the standard PAL color subcarrier frequency). The "b" mode output may also be supplied to transmitter apparatus to form an RF signal suitable for application to the antenna terminals of a modified NTSC type color receiver. Alternatively, the output may be supplied to the antenna terminals of a PAL type receiver, where the receiver includes special equipment for dual mode operations (permitting, for example, scanning circuit parameter switching; polarity deswitcher bypassing; etc.)

Where the dual standard player is incorporated with a color TV receiver in a common console, the remodulators, polarity switcher, composite signal reformer, and transmitter may, of course, be omitted, and color-difference signal outputs applied directly to the receiver matrix circuits. Altering the delay of device 86 will then be appropriate.

Figure 2:
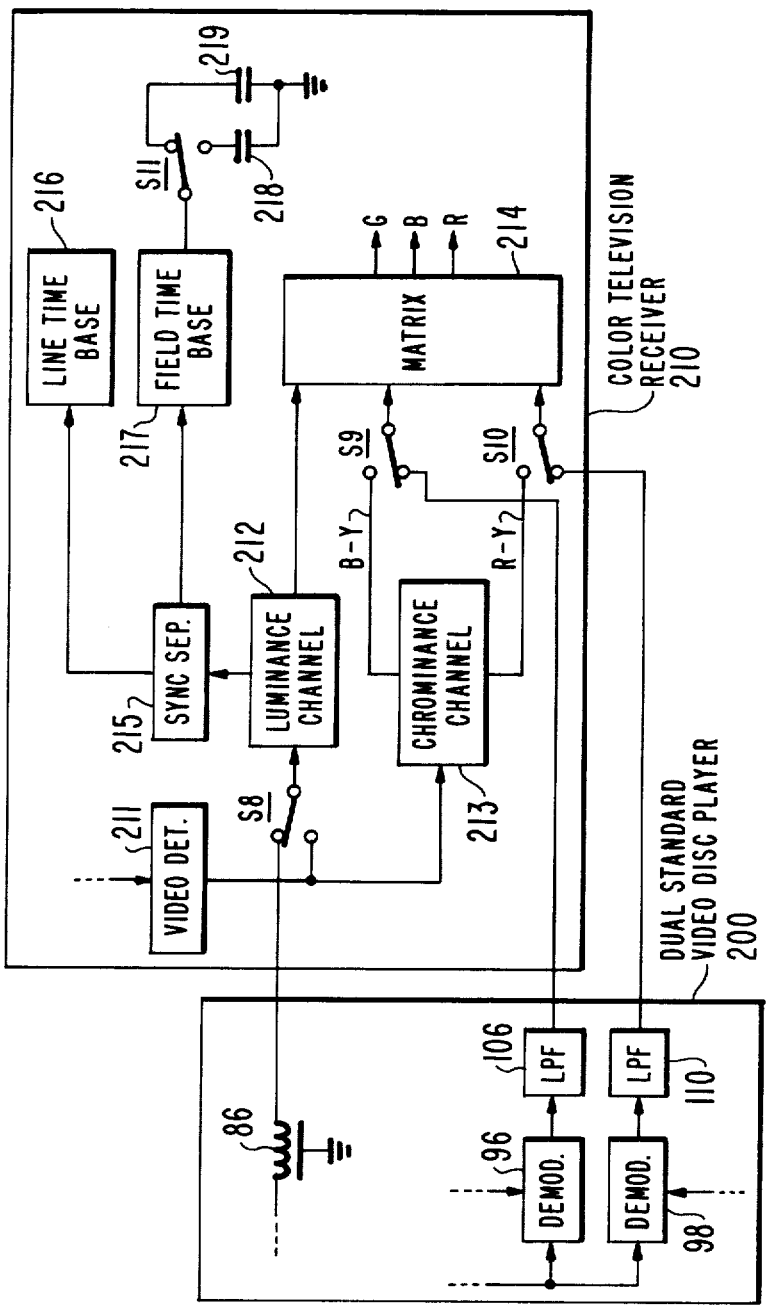
FIG. 2 illustrates a video output version of the dual standard video disc player apparatus of FIG. 1 with associated portions of a color television receiver.

In FIG. 2, the dual standard video disc player 200 represents such a video output version of the player apparatus of FIG. 1 (with only output elements shown in detail). Output signals from the player 200 include a luminance signal supplied via the delay line 86, a B-Y color-difference signal developed by demodulator 96 and filtered by LPF 106, and an R-Y color-difference signal developed by demodulator 98 and filtered by LPF 110.

In the associated color television receiver 210 (contents only partially shown), matrix circuits 214 develop respective red, green and blue color signals for delivery to a color kinescope in response to respective luminance signal, B-Y color-difference signal, and R-Y color difference signal inputs. The receiver 210 includes a trio of ganged switches S8, S9 and S10 which alter the receiver between two operating modes: a normal broadcast reception mode, and a video disc playback display mode. In FIG. 2, the switches S8, S9 and S10 are shown as thrown to the disc playback display mode positions. In such positions, switches S9 and S10 couple the color-difference signal outputs of the player 200 to the matrix circuits 214, and switch S8 couples the luminance signal output of the player 200 to the input of the receiver's luminance channel 212, which supplies signals to the receiver's sync separator 215 and supplies the luminance signal input to matrix circuits 214.

The sync separator 215 supplies deflection synchronizing signals to the receiver's line time base and field time base circuits 216 and 217, respectively. A switch S11 alternatively couples one of two different valued capacitors 218, 219 to the field time base circuit 217. Illustratively, the illustrated position of switch S11 (coupling capacitor 219) permits proper synchronization of the field time base circuit when receiving broadcast signals or disc playback signals of the same scanning standards (e.g., $f_V = 50$ Hz.) as the broadcast signals. Accordingly, during playback of signals of a different scanning standard (e.g., $f_V = 59.94$ Hz.), the switch S11 position is changed to substitute capacitor 218 for capacitor 219 to effect a time constant alteration permitting synchronization of the field time base circuit 217 to the different scanning standard.

For normal broadcast signal reception, switches S8, S9, and S10 are thrown to their opposite positions, disconnecting the receiver 210 from the player 200, and permitting the luminance channel 212 to accept signals from the receiver's video detector 211, and permitting the color difference signals developed by the receiver's chrominance channel 213 in response to the output of video detector 211 to be supplied to matrix circuits 214.

Figure 3:
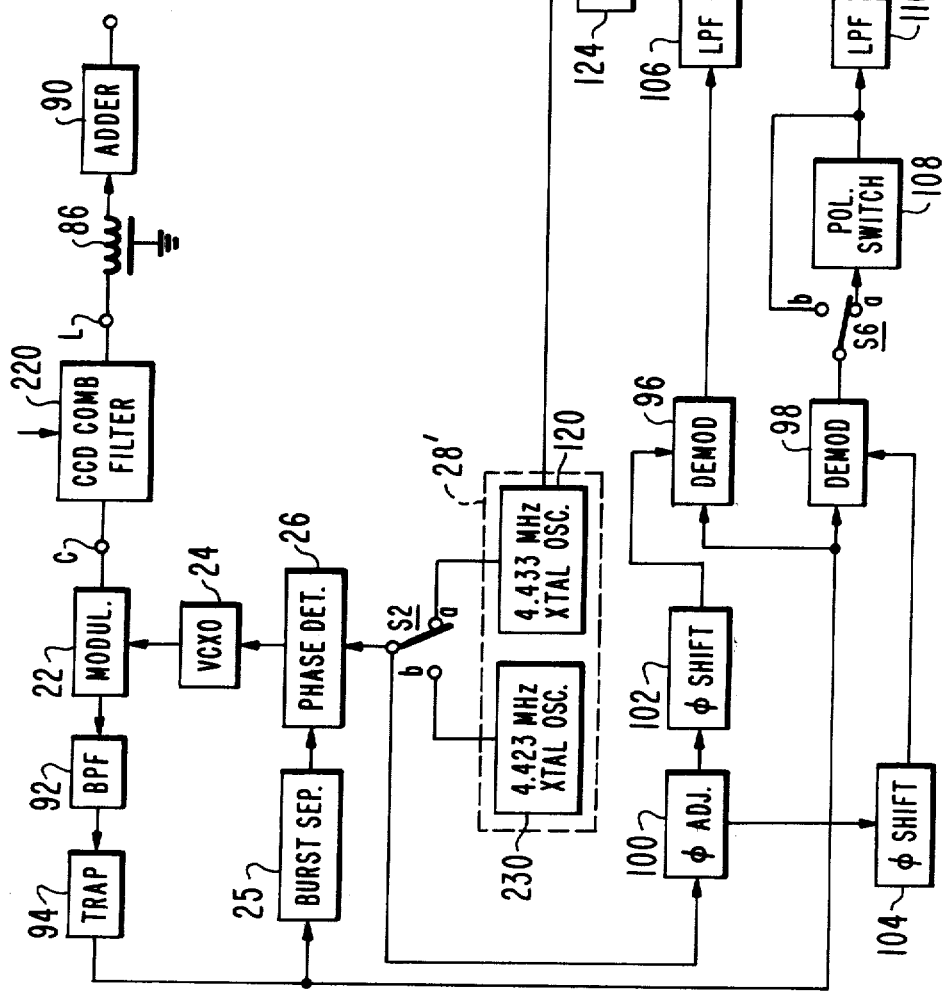
FIG. 3 illustrates a modification of the video disc player of FIG. 1 in accordance with another embodiment of the present invention.

FIG. 3 illustrates a modification of the player apparatus of FIG. 1, wherein the comb filter separation of luminance and chrominance components of recovered composite color video signals is effected by CCD apparatus prior to chrominance component up-conversion, in the general manner shown in the aforementioned Kawamoto patent. As explained previously, such CCD comb filter apparatus can function in common for satisfactory luminance/chrominance separation for signals from records of both types discussed herein, provided the respective subcarrier frequencies bear a substantially common relationship to the respective line frequencies. Accordingly, in description of the FIG. 3 dual standard disc player, it will be assumed that the record types alternatively subject to playback are: (a) Carnt, et al. type, wherein $f_H = 15,625$ Hz., $f_V = 50$ Hz., and $f_{SC} = 195 f_H/2 + f_V/2$ (1.5234625 MHz.); and (b) Pritchard type, where $f_H = 15,734.26$ Hz., $f_V = 59.94$ Hz., and $f_{SC} = 195 f_H/2$ (1.534091 MHz.)

In FIG. 3, the CCD comb filter system 220 is illustratively as illustrated in the Kawamoto patent and provides respective separated luminance and chrominance components of the signals recovered by disc playback at output terminals L and C, respectively. The luminance component appearing at terminal L is supplied via delay line 86 to the composite output signal forming adder 90.

The separated chrominance component appearing at terminal C is supplied to modulator 22 for heterodyning with the output of VCXO 24 (having a nominal output frequency of 5.97508125 MHz.) to effect an up-conversion of the chrominance component. The up-converted chrominance component is selectively passed by bandpass filter 92, and subjected to the trapping action of trap 94 which rejects VCXO operating frequencies. A burst separator 25 selects the color synchronizing burst component from the up-converted signal for application to phase detector 26 for comparison with reference waves from a reference oscillation source 28'. The phase detector output comprises an error signal which controls the VCXO output frequency in a sense opposing departures from frequency and phase synchronism between the separated up-converted bursts and the reference waves.

Pursuant to the principles of the present invention, the reference oscillation source is subject to two modes of operation as determined by the setting of switch S2. In the switch position "a" (suitable for playback of the Carnt, et al. type record), the reference waves passed by switch S2 to phase detector 26 are at the PAL subcarrier frequency of 4.43361875 MHz. as developed by the 4.433 MHz. crystal oscillator 120. In the switch position "b" (suitable for playback of the Pritchard type record), the reference waves passed by switch S2 to phase detector 26 are at a frequency of 4.42299025 MHz. as developed by the 4.423 MHz. crystal oscillator 230.

As in the FIG. 1 player, the up-converted chrominance component is supplied to demodulators 96 and 98 for recovery of the B-Y and R-Y color difference signals by synchronous detection, with reference oscillation inputs to the demodulators of appropriate phase developed by elements 100, 102, 104 in response to reference waves passed by switch S2. The remainder of the illustrated elements in FIG. 3 (elements S6, 106, 108, 110, 112, 114, 116, 122, 124) function in the same manner as similarly designated elements of FIG. 1 to develop an output chrominance component for delivery to adder 90. However, it will be noted that the carrier waves employed in the remodulation process are derived from a source (oscillator 120) which also serves as the reference wave source (for phase detector 26, and demodulators 96, 98) in one mode of player operation.

Figure 4:
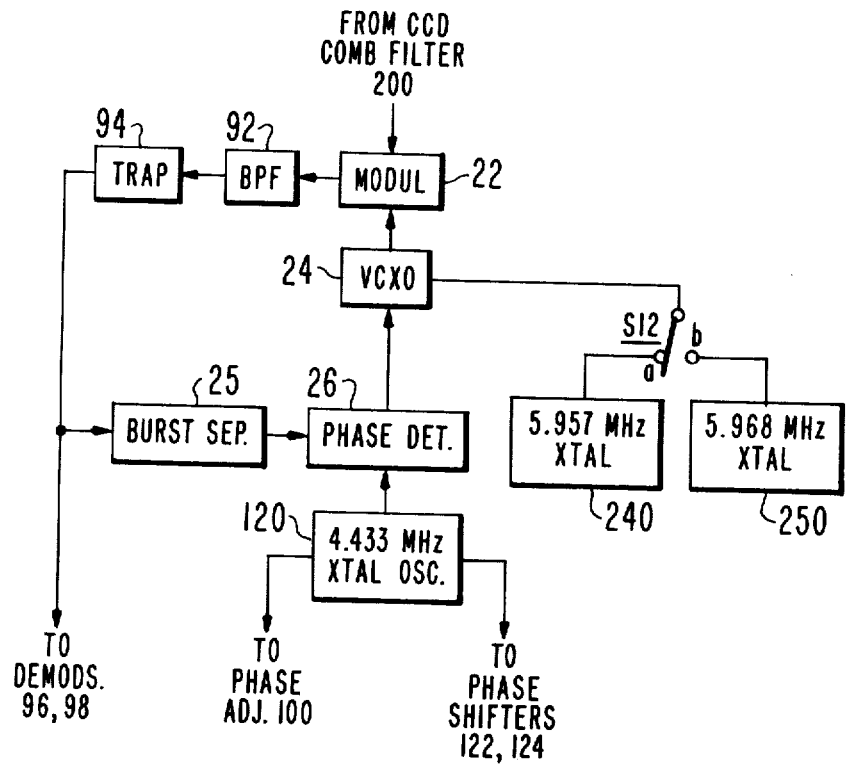
FIG. 4 illustrates an alternative modification of the apparatus of FIG. 3 in accordance with a further embodiment of the present invention.

FIG. 4 illustrates a modification of the FIG. 3 system wherein oscillator 120 (again operating at the PAL subcarrier frequency of 4.43361875 MHz.) supplies the carrier waves for the remodulation process, and also supplies the reference waves (for phase detection 26 and demodulators 96, 98) in both modes of player operation. In this embodiment, the mode switching is associated with frequency determining elements for the VCXO 24.

In the FIG. 4 arrangement, the separated chrominance component at terminal C is again supplied to modulator 22 for heterodyning with the output of VCXO 24. However, VCXO 24 is subject to two modes of operation, as determined by the positioning of switch S12. When switch S12 is in the illustrated "a" position (suitable for playback of the Carnt, et al. type record), crystal 240 serves as the frequency determining element for VCXO 24 to provide a nominal output frequency of 5.95708125 MHz. (corresponding to the sum of the PAL subcarrier frequency and the buried subcarrier frequency of 1.5234625 MHz.). When switch S12 is in the "b" position (suitable for playback of the Pritchard type of record), crystal 250 is substituted for crystal 240 to provide VCXO 24 with a nominal output frequency of 5.96771025 MHz. (corresponding to the sum of the PAL subcarrier frequency and the buried subcarrier frequency of 1.534091 MHz.).

The up-converted chrominance component developed by heterodyning is selectively passed (by elements 92, 94) to demodulators 96, 98 and to burst separator 25, as in FIG. 3. The inputs to phase detector 26, the output of which controls VCXO 24, are the separated bursts provided by separator 25 and reference waves supplied in both operating modes by oscillator 120.

It may be noted that in the player of FIG. 1, the processes of up-conversion, time base error correction, demodulation and remodulation involve the use of a total complement of three crystal oscillators (24, 28, 120) employing a total of four crystals (two being associated with oscillator 28). In the simplified player of FIG. 3, these same processes again involve the use of a total complement of three crystal oscillators (24, 120, 230) but a total of only three crystals is required. In the modified player of FIG. 4, the processes of up-conversion, time base error correction, demodulation and remodulation involve the use of a total complement of only two crystal oscillators (24, 120), employing, however, a total of three crystals (two being associated with oscillator 24).

In description of the FIG. 3 and FIG. 4 embodiments of the invention, reference was made to operations involving playback of a Carnt, et al. type of record where the buried subcarrier frequency corresponded to 195 $f_H/2 + f_V/2$ (1.5234625 MHz.). It will be appreciated that the FIG. 1 apparatus may be suitably modified to facilitate playback (in mode "a") of a record with such a subcarrier frequency value. Illustratively, this may be effected by altering the nominal output frequency of VCXO 24 to 381 $f_H + f_V/2$ (5.953150 MHz.), and substituting a 4.419059 crystal for the 4.372184 MHz. crystal (32). Alternatively, this may be effected without change of VCXO frequency, by substituting a 4.3828125 MHz. crystal for the 4.4296875 MHz. crystal (30).

What is claimed is:

1. In a dual-mode video record player for alternative use in (1) the playback of records bearing composite color video signals of a first type inclusive of a chrominance signal component and an accompanying color synchronizing component, wherein said chrominance signal component comprises modulated color subcarrier waves having a first color subcarrier frequency and said accompanying color synchronizing component comprises periodic bursts of oscillations of said first subcarrier frequency, and (2) the playback of records bearing composite color video signals of a second type inclusive of a chrominance signal component and an accompanying color synchronizing component, wherein said chrominance signal component comprises modulated color subcarrier waves having a second color subcarrier frequency and said accompanying color synchronizing component comprises periodic bursts of oscillations of said second color subcarrier frequency; said record player including signal pickup means for recovering composite color video signals from a record during playback operations; the combination comprising:

dual-mode oscillation generating means for developing reference oscillations of a first frequency when operating in a first mode and for developing reference oscillations of a second frequency when operating in a second mode; said generating means including switch means for selectively altering the generating means operating mode between said first and second modes;

a voltage controlled oscillator;

heterodyning means responsive to an output of said voltage controlled oscillator and to said recovered signals for developing an output inclusive of an up-converted chrominance signal component and accompanying color synchronizing component, with the color subcarrier frequency of said up-converted chrominance signal component and accompanying color synchronizing component corresponding in frequency to the difference between the output frequency of said voltage controlled oscillator and the color subcarrier frequency of the chrominance component and accompanying color synchronizing component of said recovered signals;

phase detector means responsive to said up-converted color synchronizing component and to reference oscillations developed by said generating means for developing an error voltage indicative of departures from a predetermined phase relationship between said up-converted color synchronizing component and said reference oscillations;

means for utilizing said error voltage to alter the operation of said voltage controlled oscillator in a sense opposing said departures; and output signal forming means responsive to an output of said heterodyning means;

wherein the frequency difference between said first reference oscillation frequency and said second reference oscillation frequency substantially corresponds to the frequency difference between said first color subcarrier frequency and said second color subcarrier frequency.

2. Apparatus in accordance with claim 1 wherein said output signal forming means includes:

a synchronous detector, responsive to an up-converted chrominance signal component derived from an output of said heterodyning means and to reference oscillations derived from said oscillation generating means, for recovering a color-difference signal; and modulator means, responsive to said recovered color-difference signal, for forming an output chrominance signal.

3. Apparatus in accordance with claim 2 wherein said output signal forming means also includes comb filter means interposed between said heterodyning means and said synchronous detector for selectively passing said up-converted chrominance signal component, and wherein said comb filter means includes:

a first comb filter including a delay device providing a delay of a magnitude substantially corresponding to the sum of a half period at said first color subcarrier frequency and a plurality of full periods at said first color subcarrier frequency;

a second comb filter including a delay device providing a delay of a magnitude substantially corresponding to the sum of a half period at said second color subcarrier frequency and a plurality of full periods at said second color subcarrier frequency and additional switching means, ganged with said first-named switching means, and having a first switching state when said generating means operates in said first mode, and a second switching state when said generating means operates in said second mode; said additional switching means, when in said first switching state, causing the selective passing of said up-converted chrominance component to be effected by said first comb filter, to the exclusion of said second comb filter; said additional switching means, when in said second switching stage, causing the selective passing of said up-converted chrominance component to be effected by said second comb filter, to the exclusion of said first comb filter.

4. In a dual-mode video record player for alternative use in (1) the playback of records bearing composite color video signals of a first scanning standard type inclusive of a chrominance signal component and an accompanying color synchronizing component, wherein said chrominance signal component comprises modulated color subcarrier waves having a first color subcarrier frequency, said first color subcarrier frequency substantially corresponding to an odd integral multiple of half the line frequency of said first scanning standard, and wherein said accompanying color synchronizing component comprises period bursts of oscillations of said first subcarrier frequency, and (2) the playback of records bearing composite color video signals of a second scanning standard type inclusive of a chrominance signal component and an accompanying color synchronizing component, wherein said chrominance signal component comprises modulated color subcarrier waves having a second color subcarrier frequency, said second color subcarrier frequency substantially corresponding to an odd integral multiple of half the line frequency of said second scanning standard, and wherein said accompanying color synchronizing component comprises periodic bursts of oscillations of said second color subcarrier frequency; said record player including signal pickup means for recovering composite color video signals from a record during playback operations; the combination comprising:

dual-mode oscillation generating means for developing reference oscillations of a first frequency when operating in a first mode and for developing reference oscillations of a second frequency when operating in a second mode; said generating means including switch means for establishing said first operating mode during playback of records of said first type, and for establishing said second operating mode during playback of records of said second type;

a voltage controlled oscillator;

heterodyning means responsive to an output of said voltage controlled oscillator and to said recovered signals for developing an output inclusive of an up-converted chrominance signal component and accompanying color synchronizing component, with the color subcarrier frequency of said up-converted chrominance signal component and accompanying color synchronizing component corresponding in frequency to the difference between the output frequency of said voltage controlled oscillator and the color subcarrier frequency of the chrominance component and accompanying color synchronizing component of said recovered signals;

phase detector means responsive to said up-converted color synchronizing component and to reference oscillations developed by said generating means for developing an error voltage indicative of departures from a predetermined phase relationship between said up-converted color synchronizing component and said reference oscillations;

means for applying said error voltage to said voltage controlled oscillator to alter the output thereof in a sense opposing said departures; and output signal forming means responsive to an output of said heterodyning means;

wherein the frequency difference between said first reference oscillation frequency and said second reference oscillation frequency substantially corresponds to the frequency difference between said first color subcarrier frequency and said second color subcarrier frequency.

5. Apparatus in accordance with claim 4 wherein said output signal forming means includes:

synchronous detection means, responsive to an up-converted chrominance signal component and to reference oscillations derived from said oscillation generating means, for recovering color-difference signals;

modulator means, responsive to said recovered color-difference signals, for forming an output chrominance signal; and comb filter means for selectively passing said up-converted chrominance signal component developed by said heterodyning means to said synchronous detection means, wherein said comb filter means includes:

a first comb filter including a delay device providing a delay of a magnitude substantially corresponding to a period at said line frequency of said first scanning standard;

a second comb filter including a delay device providing a delay of magnitude substantially corresponding to a period at the line frequency of said second scanning standard; and additional switching mans, coupled to said comb filters and ganged with said first-named switching means, and having a first switching state when said generating means operates in said first mode, and a second switching state when said generating means operates in said second mode; said additional switching means, when in said first switching state, causing the selective passing of said up-converted chrominance component to be effected by said first comb filter, to the exclusion of said second comb filter; said additional switching means, when in said second switching state, causing the selective passing of said up-converted chrominance component to be effected by said second comb filter, to the exclusion of said first comb filter.

6. In a dual-mode video record player for alternative use in (1) the playback of records bearing composite color video signals of a first scanning standard type inclusive of a chrominance signal component and an accompanying color synchronizing component, wherein said chrominance signal component comprises modulated color subcarrier waves having a first color subcarrier frequency, and wherein said accompanying color synchronizing component comprises periodic bursts of oscillations of said first subcarrier frequency, and (2) the playback of records bearing composite color video signals of a second scanning standard type inclusive of a chrominance signal component and an accompanying color synchronizing component, wherein said chrominance signal component comprises modulated color subcarrier waves having a second color subcarrier frequency, and wherein said accompanying color synchronizing component comprises periodic bursts of oscillations of said second color subcarrier frequency; said record player including signal pickup means for recovering composite color video signals from a record during playback operations; and combination comprising:

first oscillation generating means for developing reference oscillations;

second oscillation generating means comprising a voltage controlled oscillator;

heterodyning means responsive to an output of said voltage controlled oscillator and to said recovered signals for developing an output inclusive of an up-converted chrominance signal component and accompanying color synchronizing component, with the color subcarrier frequency of said up-converted chrominance signal component and accompanying color synchronizing component corresponding in frequency to the difference between the output frequency of said voltage controlled oscillator and the color subcarrier frequency of the chrominance component and accompanying color synchronizing component of said recovered signals;

phase detector means responsive to said up-converted color synchronizing component and to reference oscillations developed by said first oscillation generating means for developing an error voltage indicative of departures from a predetermined phase relationship between said up-converted color synchronizing component and said reference oscillations;

means for applying said error voltage to said second oscillation generating means to alter the output frequency thereof in a sense opposing said departures; and output signal forming means responsive to an output of said heterodyning means;

wherein one of said oscillation generating means is alternatively subject to operation in respective first and second operating modes resulting in respectively different nominal output frequencies therefor, and includes switch means for establishing said first operating mode during playback of records of said first type, and for establishing said second operating mode during playback of records of said second type; and wherein the frequency difference between said respectively different output frequencies substantially corresponds to the frequency difference between said first color subcarrier and said second color subcarrier frequency.

7. Apparatus in accordance with claim 6 wherein said output signal forming means includes:

synchronous detection means, responsive to an up-converted chrominance signal component and to reference oscillations derived from said first oscillation generating means, for recovering color-difference signals; and modulator means, responsive to said recovered color-difference signals, for forming an output chrominance signal.

8. Apparatus in accordance with claim 6, wherein said composite color video signals of each of said first and second scanning standard types also include a luminance signal component, a portion of which is frequency interleaved with the respective chrominance component in a frequency band surrounding the respective color subcarrier frequency; and wherein said first color subcarrier frequency substantially corresponds to half the line frequency of said first scanning standard multiplied by a given odd integral number, and said second color subcarrier frequency substantially corresponds to half the line frequency of said second scanning standard multiplied by said given odd integral multiple; said apparatus also including:

CCD comb filter means, interposed between said signal pickup means and said heterodyning means, for precluding passage of said frequency interleaved portion of the luminance signal component of said recovered signals to said heterodyning means while permitting chrominance signal component passage thereto;

wherein said interposition is effected by fixed couplings independent of the operating mode of said one oscillation generating means.

* * * * *